(12) United States Patent
Moen et al.

(10) Patent No.: US 11,904,830 B2
(45) Date of Patent: Feb. 20, 2024

(54) CLEANING SYSTEM FOR AN AGRICULTURAL SPRAYER

(71) Applicant: CNH Industrial America LLC, New Holland, PA (US)

(72) Inventors: Richard Arden Moen, Glenwood, MN (US); William A. Roach, Lake Lillian, MN (US); Kevin Hammer, Benson, MN (US); John Paul Honermann, Benson, MN (US)

(73) Assignee: CNH Industrial America LLC, New Holland, PA (US)

( * ) Notice: Subject to any disclaimer, the term of this patent is extended or adjusted under 35 U.S.C. 154(b) by 213 days.

(21) Appl. No.: 17/353,963

(22) Filed: Jun. 22, 2021

(65) Prior Publication Data

US 2022/0266311 A1     Aug. 25, 2022

Related U.S. Application Data

(60) Provisional application No. 63/151,921, filed on Feb. 22, 2021.

(51) Int. Cl.
*B08B 3/02*     (2006.01)
*B08B 5/02*     (2006.01)
(Continued)

(52) U.S. Cl.
CPC ......... *B60W 10/103* (2013.01); *A01B 59/002* (2013.01); *A01C 23/007* (2013.01);
(Continued)

(58) Field of Classification Search
CPC ......... B60W 10/103; B60W 30/18118; B60W 40/076; B60W 10/18; B60W 10/182;
(Continued)

(56) References Cited

U.S. PATENT DOCUMENTS

| | | | |
|---|---|---|---|
| 5,125,576 A * | 6/1992 | Ziegenbein | ......... A01M 7/0085 239/113 |
| 7,785,420 B2 | 8/2010 | Beijbom et al. | |

(Continued)

FOREIGN PATENT DOCUMENTS

| | | |
|---|---|---|
| WO | WO 2008/084327 | 7/2008 |
| WO | WO 2020/243450 | 12/2020 |
| WO | WO 2020/257628 | 12/2020 |

*Primary Examiner* — Benjamin L Osterhout
(74) *Attorney, Agent, or Firm* — Rebecca L. Henkel; Rickard K. DeMille (57) ABSTRACT

A cleaning system for an agricultural sprayer may include a sprayer boom, a plurality of nozzle assemblies provided in association with the sprayer boom and configured to dispense an agricultural product during a spraying operation of the agricultural sprayer, a first cleaning fluid tank configured to hold a first cleaning fluid, and a nozzle assembly fluid circuit fluidly coupling the plurality of nozzle assemblies and the first cleaning fluid tank. Moreover, the cleaning system may include a cleaning station supported on the sprayer boom, the cleaning station comprising a first valve. Additionally, the cleaning system may include a first cleaning fluid circuit fluidly coupling the first valve and the first cleaning fluid tank. The first valve is configured to supply the first cleaning fluid therethrough when the first valve is in an open position.

20 Claims, 6 Drawing Sheets

(51) Int. Cl.

| | |
|---|---|
| B60W 10/103 | (2012.01) |
| B67D 7/36 | (2010.01) |
| B67D 7/02 | (2010.01) |
| G01M 3/32 | (2006.01) |
| A01M 7/00 | (2006.01) |
| B60W 10/18 | (2012.01) |
| A01C 23/00 | (2006.01) |
| G05D 1/00 | (2006.01) |
| G07C 5/00 | (2006.01) |
| G07C 5/08 | (2006.01) |
| A01D 41/127 | (2006.01) |
| A01D 69/00 | (2006.01) |
| B05B 15/55 | (2018.01) |
| A01C 23/04 | (2006.01) |
| B05B 12/08 | (2006.01) |
| B67D 7/38 | (2010.01) |
| B67D 7/78 | (2010.01) |
| B67D 99/00 | (2010.01) |
| B05B 12/14 | (2006.01) |
| A01B 59/00 | (2006.01) |
| E02F 3/46 | (2006.01) |
| E02F 9/22 | (2006.01) |
| B05B 15/65 | (2018.01) |
| B05B 12/16 | (2018.01) |
| B05B 1/20 | (2006.01) |
| B05B 12/02 | (2006.01) |
| B60W 30/18 | (2012.01) |
| B60W 40/076 | (2012.01) |
| B60W 10/06 | (2006.01) |
| B05B 14/00 | (2018.01) |
| G01F 23/70 | (2006.01) |

(52) U.S. Cl.
CPC .......... *A01C 23/008* (2013.01); *A01C 23/047* (2013.01); *A01D 41/1274* (2013.01); *A01D 69/00* (2013.01); *A01M 7/0042* (2013.01); *A01M 7/0057* (2013.01); *A01M 7/0085* (2013.01); *A01M 7/0089* (2013.01); *B05B 1/20* (2013.01); *B05B 12/02* (2013.01); *B05B 12/081* (2013.01); *B05B 12/085* (2013.01); *B05B 12/14* (2013.01); *B05B 12/16* (2018.02); *B05B 15/55* (2018.02); *B05B 15/65* (2018.02); *B08B 3/02* (2013.01); *B08B 5/02* (2013.01); *B60W 10/06* (2013.01); *B60W 10/18* (2013.01); *B60W 10/182* (2013.01); *B60W 30/18118* (2013.01); *B60W 40/076* (2013.01); *B67D 7/02* (2013.01); *B67D 7/0294* (2013.01); *B67D 7/36* (2013.01); *B67D 7/362* (2013.01); *B67D 7/38* (2013.01); *B67D 7/78* (2013.01); *B67D 99/00* (2013.01); *E02F 3/46* (2013.01); *E02F 9/2271* (2013.01); *E02F 9/2275* (2013.01); *G01M 3/3245* (2013.01); *G05D 1/0016* (2013.01); *G07C 5/008* (2013.01); *G07C 5/08* (2013.01); *B05B 14/00* (2018.02); *B08B 2203/0205* (2013.01); *B60W 2520/10* (2013.01); *B60W 2552/15* (2020.02); *B60W 2720/10* (2013.01); *G01F 23/70* (2013.01); *G05D 2201/0201* (2013.01)

(58) Field of Classification Search
CPC .. B60W 2520/10; B05B 12/085; B05B 15/55; B05B 9/035; B05B 1/20; B05B 12/081; B05B 12/02; B05B 12/16; B05B 13/005; B05B 12/14; B05B 15/65; B05B 12/087; B05B 1/205; B05B 14/00; G01M 3/3245; B67D 7/36; B67D 7/78; B67D 7/0294; B67D 99/00; B67D 7/02; B67D 7/362; B67D 7/38; A01M 7/0085; A01M 7/0042; A01M 7/0089; A01M 7/0057; G05D 1/0016; G05D 2201/0201; E02F 9/2271; E02F 9/2275; E02F 3/46; A01C 23/007; A01C 23/047; A01C 23/008; G07C 5/008; G07C 5/08; B08B 5/02; B08B 3/02; B08B 2203/0205; A01B 59/002; A01D 41/1274; A01D 69/00; G01F 23/70

See application file for complete search history.

(56) References Cited

U.S. PATENT DOCUMENTS

| | | | |
|---|---|---|---|
| 8,307,845 | B2 | 11/2012 | Kouchi et al. |
| 9,192,969 | B2 | 11/2015 | Saint |
| 9,766,105 | B2 | 9/2017 | Ni |
| 10,219,506 | B2 | 3/2019 | Ni |
| 10,426,253 | B2 | 10/2019 | Baumann et al. |
| 10,499,561 | B2 | 12/2019 | Grotelueschen et al. |
| 10,786,826 | B2 | 9/2020 | Sullivan et al. |
| 2007/0290152 | A1* | 12/2007 | Ma .............. F16K 31/406 251/30.01 |
| 2011/0045194 | A1 | 2/2011 | Herre et al. |
| 2014/0252111 | A1* | 9/2014 | Michael ........... A01M 7/0042 239/11 |
| 2018/0369851 | A1* | 12/2018 | Engelbrecht ........ A01M 7/0089 |
| 2019/0009285 | A1 | 1/2019 | Zimmerman et al. |
| 2019/0022687 | A1* | 1/2019 | Brooks ............. A01M 7/0089 |
| 2019/0166757 | A1 | 6/2019 | Mercer et al. |
| 2020/0037519 | A1 | 2/2020 | Wonderlich et al. |
| 2020/0047206 | A1 | 2/2020 | Dunkel et al. |
| 2020/0113170 | A1* | 4/2020 | Davis ................ A01M 7/0089 |
| 2020/0113171 | A1* | 4/2020 | Davis ................ A01M 7/005 |
| 2020/0390079 | A1* | 12/2020 | Brooks ................ B05B 1/20 |

* cited by examiner

CLEANING SYSTEM FOR AN AGRICULTURAL SPRAYER

CROSS REFERENCE TO RELATED APPLICATION

The present application is based upon and claims the right of priority to U.S. Provisional Patent Application No. 63/151,921 filed on Feb. 22, 2021, the entirety of which is incorporated by reference herein for all purposes.

FIELD OF THE INVENTION

The present disclosure relates generally to agricultural sprayers and, more particularly, to a cleaning system for an agricultural sprayer.

BACKGROUND OF THE INVENTION

Agricultural applicators or sprayers have been used within the industry for applying an agricultural product to crops and/or a surface of a field. The agricultural product may be in the form of a solution or mixture, with a carrier (such as water) being mixed with one or more active ingredients, such as a pesticide(s) (e.g., an herbicide(s), insecticide(s), rodenticide(s), etc.) and/or a nutrient(s). Typically, an applicator or sprayer is pulled as an implement or is self-propelled, and includes a tank, a pump, and a sprayer boom. The sprayer boom can include a pair of boom arms, with each boom arm extending to either side of the sprayer when in an unfolded state. Each boom arm may include multiple boom sections, each with a number of spray nozzles (also sometimes referred to as spray tips).

The spray nozzles generally dispense the agricultural product within the field. However, during a spray operation, one or more of the spray nozzles can become clogged, which negatively affects the quality of the spray operation. For instance, the clogged spray nozzles can cause skipped areas in the field, which creates opportunities for pests or weeds to damage crops. Once clogged spray nozzles are detected, an operator typically removes the clogged nozzles and clears the plugs manually (e.g., by blowing on the spray nozzle by mouth). However, such process is time consuming and potentially hazardous for an operator.

Accordingly, a cleaning system for an agricultural sprayer would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a cleaning system for an agricultural sprayer. The system includes a sprayer boom and a plurality of nozzle assemblies provided in association with the sprayer boom, where the plurality of nozzle assemblies are configured to dispense an agricultural product during a spraying operation of the agricultural sprayer. The system further includes a first cleaning fluid tank configured to hold a first cleaning fluid, a nozzle assembly fluid circuit fluidly coupling the plurality of nozzle assemblies and the first cleaning fluid tank, a cleaning station supported on the sprayer boom, and a first cleaning fluid circuit. The cleaning station has a first valve, and the first cleaning fluid circuit fluidly couples the first valve and the first cleaning fluid tank. The first valve is configured to supply the first cleaning fluid therethrough when the first valve is in an open position.

In another aspect, the present subject matter is directed to an agricultural sprayer. The agricultural sprayer includes a sprayer boom and a plurality of nozzle assemblies provided in association with the sprayer boom, where the plurality of nozzle assemblies are configured to dispense an agricultural product during a spraying operation of the agricultural sprayer. The agricultural sprayer further includes a compressed air supply configured to provide compressed air, a cleaning station supported on the agricultural sprayer, and a cleaning air circuit. The cleaning station has a first valve and the cleaning air circuit fluidly couples the first valve and the compressed air supply. The compressed air valve is configured to supply compressed air therethrough when the first valve is in an open position.

In an additional aspect, the present subject matter is directed to a cleaning station for an agricultural sprayer having a sprayer boom and a plurality of nozzle assemblies supported on the sprayer boom. The cleaning station includes a housing and a first valve configured to be fluidly coupled to a compressed air source via a cleaning air circuit, with the first valve being configured to supply compressed air from the compressed air source therethrough when in an open position. The cleaning station further includes a second valve configured to be fluidly coupled to a cleaning fluid source via a cleaning fluid circuit, with the second valve being configured to supply cleaning fluid from the cleaning fluid source therethrough when in an open position. A pressure regulator adjustable to vary a pressure of the compressed air or the cleaning fluid supplied to the first valve or the second valve, respectively. The first and second valves are at least partially received within the interior volume of the housing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to cleaning systems for an agricultural sprayer. Specifically, in several embodiments, a cleaning system includes a cleaning station on the agricultural sprayer, where the cleaning station has at least one valve for selectively supplying a cleaning fluid. For instance, the cleaning station may include a valve for selectively supplying compressed air from a compressed air source and/or a valve for selectively supplying a different cleaning fluid, such as water, from a separate cleaning fluid source. The cleaning station may further include one or more pressure regulators for adjusting the pressure of the cleaning fluid supplied through one or more of the valves. In some embodiments, the cleaning station is positioned on the boom such that it is quickly accessible after detaching spray nozzles from the nozzle assemblies. Using the disclosed cleaning station, an operator may quickly, and more safely, remove plugged materials from the spray nozzles, wash their hands after handling spray nozzles, and/or the like.

Figure 1:
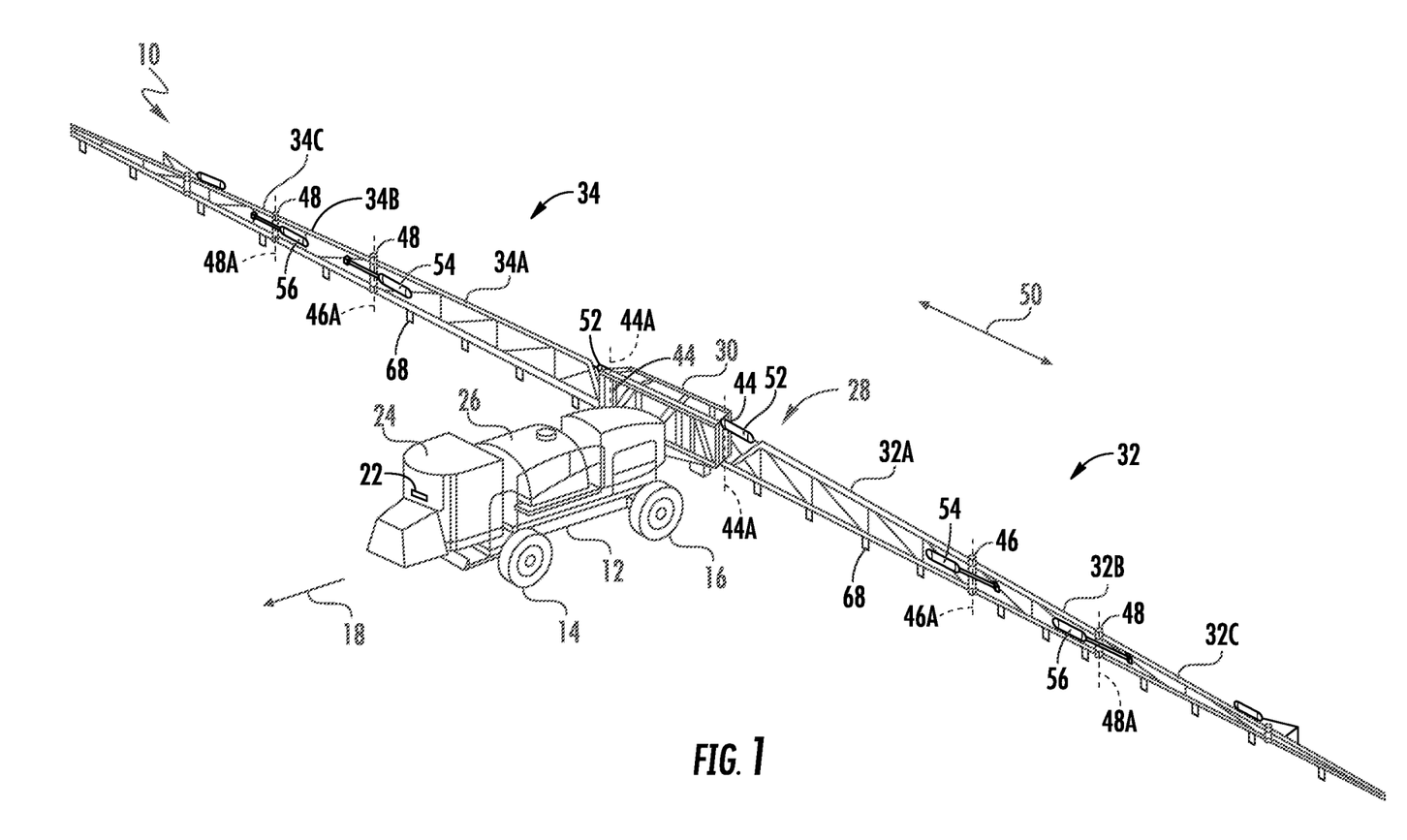
FIG. 1 illustrates a perspective view of one embodiment of an agricultural sprayer in accordance with aspects of the present subject matter.
Figure 2:
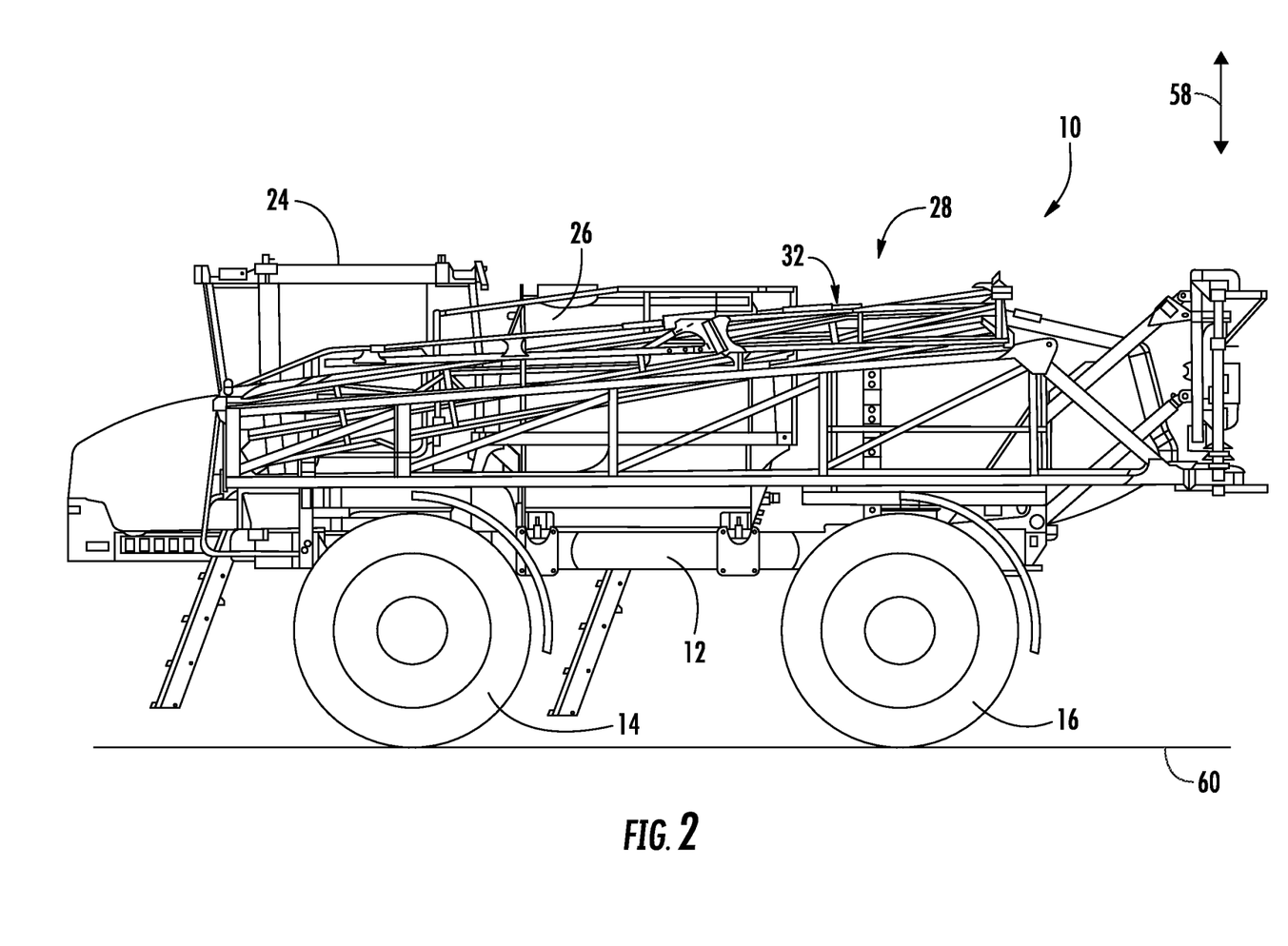
FIG. 2 illustrates a side view of the agricultural sprayer of FIG. 1 in accordance with aspects of the present subject matter.

Referring now to FIGS. 1 and 2, differing views of one embodiment of an agricultural sprayer 10 are illustrated in accordance with aspects of the present subject matter. Specifically, FIG. 1 illustrates a perspective view of the sprayer 10 with its sprayer boom in a working or unfolded position and FIG. 2 illustrates a side view of the sprayer with its sprayer boom in a transport or folded position. In the illustrated embodiment, the agricultural sprayer 10 is configured as a self-propelled agricultural sprayer. However, in alternative embodiments, the agricultural sprayer 10 may be configured as any other suitable type of agricultural sprayer 10 configured to perform agricultural spraying operations, such as a tractor or other vehicle configured to haul a spraying or application implement.

As shown in FIG. 1, the agricultural sprayer 10 may include a chassis or frame 12 configured to support or couple to a plurality of components. For example, a pair of steerable front wheels 14 (one is shown) and a pair of driven rear wheels 16 (one is shown) may be coupled to the frame 12. The wheels 14, 16 may be configured to support the agricultural sprayer 10 relative to the ground and move the agricultural sprayer 10 in a direction of travel (e.g., as indicated by arrow 18 in FIG. 1) across a field. In this regard, the agricultural sprayer 10 may include an engine (not shown) and a transmission (not shown) configured to transmit power from the engine to the wheels 14, 16. However, it should be appreciated that, in further embodiments, the front wheels 14 of the agricultural sprayer 10 may be driven in addition to or in lieu of the rear wheels 16. The frame 12 may also support an operator's cab 24 that houses various control or input devices (e.g., levers, pedals, control panels, buttons, and/or the like) for permitting an operator to control the operation of the work vehicle 10. For instance, as shown in FIG. 1, the agricultural sprayer 10 may include a human-machine or user interface 22 for displaying message windows and/or alerts to the operator and/or for allowing the operator to interface with the vehicle's controller or computing system. In one embodiment, the user interface 22 may include joysticks, buttons, knobs and/or any other suitable input devices that allow the operator to provide user inputs to an associated controller or computing system.

Furthermore, the frame 12 may also support one or more tanks 26 and a frame or sprayer boom 28 mounted on the frame 12. Each tank 26 is generally configured to store or hold clean water, an agricultural product (e.g., a pesticide, a nutrient, and/or the like), compressed air, and/or the like. A plurality of nozzle assemblies 68 are mounted on the sprayer boom 28 and configured to selectively dispense the agricultural product stored in the associated tank 26, and/or a mix of the agricultural product and clean water from the associated tanks 26, via nozzles onto underlying plants and/or soil. The nozzle assemblies 68 are generally spaced apart from each other on the sprayer boom 28 along a lateral direction 50. Furthermore, fluid conduits (not shown) may fluidly couple the nozzle assemblies 68 to the tank(s) 26. Each nozzle assembly 68 may include a nozzle valve and an associated spray tip or spray nozzle.

Figure 3:
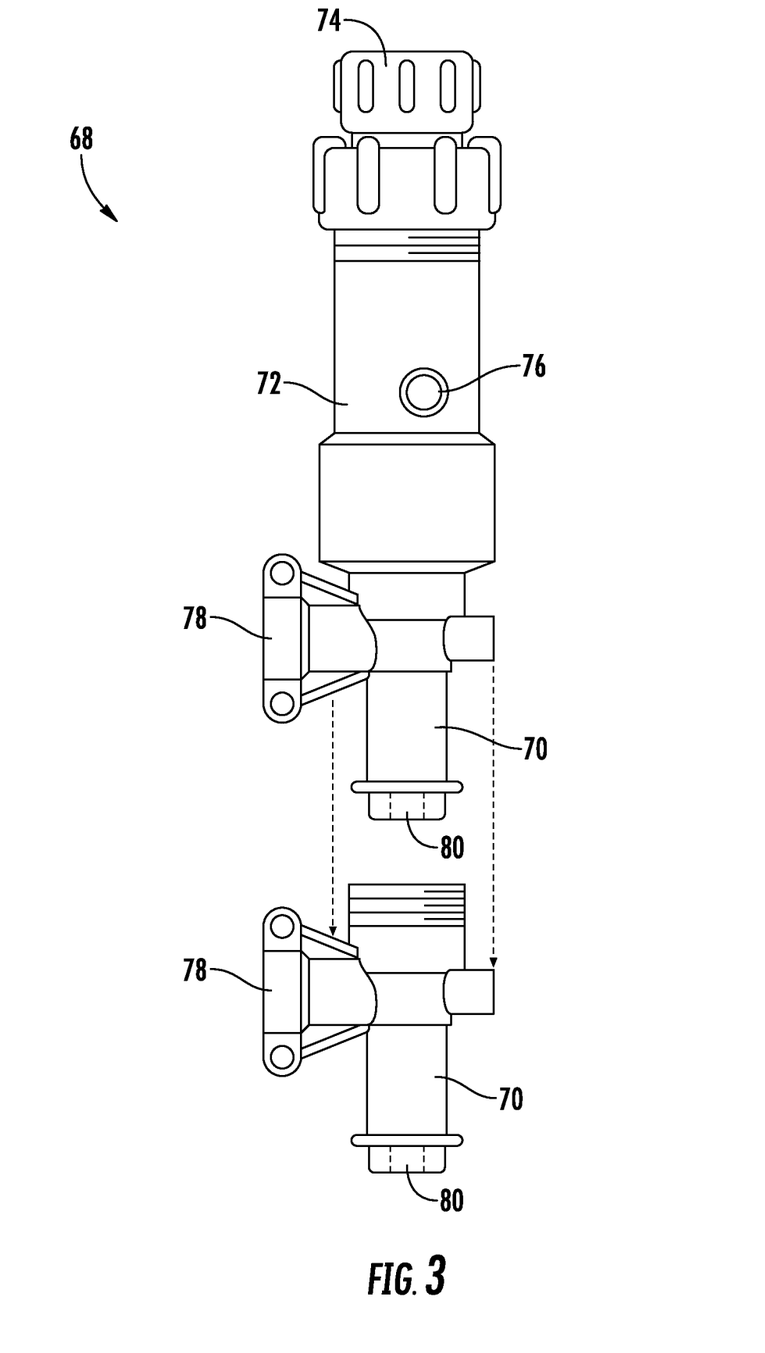
FIG. 3 illustrates a detail view of a spray nozzle assembly suitable for use with the agricultural sprayer of FIG. 1 in accordance with aspects of the present subject matter.

For instance, one embodiment of a nozzle assembly 68 suitable for use with an agricultural sprayer, such as the agricultural sprayer 10, is shown in FIG. 3. The nozzle assembly 68 includes a spray nozzle 70 detachably couplable to a mixing body 72, which is in turn detachably couplable to a control valve 74. The mixing body 72 includes a mixing body inlet 76 for receiving agricultural product (e.g., pesticide, a nutrient, and/or the like) from a product tank of the sprayer 10. The spray nozzle 70 includes a nozzle body inlet 78 for receiving carrier fluid (e.g., water) from a water tank (e.g., tank 26B in FIG. 6) of the sprayer 10. The spray nozzle 70 further includes a nozzle body outlet 80. A mixture of the agricultural product and carrier fluid received through the inlets 76, 78 exits through the nozzle body outlet 80 for a spraying operation. The control valve 74 may be controlled to allow or block the agricultural mixture flow through the nozzle body outlet 80. In several embodiments, the operation of each nozzle valve 74 may be individually controlled by an associated controller or computing system such that the valve regulates the flow rate and/or other spray characteristic of the agricultural product through the associated spray nozzle. For instance, in some embodiments, the control valve 74 is an actively controllable solenoid valve controlled by a controller of the agricultural sprayer 10. However, in other embodiments, the control valve 74 is a mechanical valve that is controlled by the pressure of the flow through the spray nozzle assembly 68. It should be appreciated that any other suitable nozzle assembly 68 may be used with the agricultural sprayer 10.

Referring back to FIGS. 1 and 2, inn some embodiments, to improve the agricultural product application quality and/or operator comfort, the sprayer 10 can be equipped with a passive, semi-active, or active suspension system 31 (FIG. 6) to damp movement of the sprayer 10 during operation. For instance, the suspension system 31 (FIG. 6) may be configured to isolate the cab 24 and/or the sprayer boom 28 from vibrations caused by uneven terrain. Such suspension system can include vibration isolators mounted between the chassis 12 and the wheels 14, 16 of the sprayer 10. Passive systems use passive vibration isolators (e.g., rubber isolators, springs with friction or viscous dampers) to damp vibrations with different isolators used to damp different frequencies. Semi-active systems achieve control and isolation between the chassis 12 and the cab 24 and/or sprayer boom 28 by controlling a damper to selectively remove energy from the system in response to movement of the cab/boom (e.g., as monitored via sensors). Active systems use one or more sensors to sense movement and an associated controller or computing system to generate control signals for an actuator (e.g., a pneumatic actuator) which applies a force to the cab 24 and/or sprayer boom 28 to cancel vibrations transmitted to the cab/boom by the chassis 12.

As shown in FIGS. 1 and 2, the sprayer boom 28 of the agricultural sprayer 10 may generally be movable between a working or unfolded position (FIG. 1) and a transport or folded position (FIG. 2). In the working position, various sections of the sprayer boom 28 are fully extended such that the sprayer boom 28 extends over as wide a section of a field as possible. In the transport position, the various sections of the sprayer boom 28 are fully retracted to reduce the width of the sprayer 10 for travel. As will be described below, the sprayer boom 28 may include a plurality of fold actuators coupled between adjacent boom sections of the sprayer boom 28 for moving the sprayer boom 28 between the working and transport positions.

As shown in FIG. 1, in one embodiment, the sprayer boom 28 includes a central boom section 30, a left boom arm 32, and a right boom arm 34. The left boom arm 32 includes a left inner boom section 32A pivotably coupled to the central boom section 30, a left middle boom section 32B pivotably coupled to the left inner boom section 32A, and a left outer boom section 32C pivotably coupled to the left middle boom section 32B. Similarly, the right boom arm 34 includes a right inner boom section 34A pivotably coupled to the central boom section 30, a right middle boom section 34B pivotably coupled to the right inner boom section 34A, and a right outer boom section 34C pivotably coupled to the right middle boom section 34B. Each of the inner boom sections 32A, 34A is pivotably coupled to the central boom section 30 at pivot joints 44. Similarly, the middle boom sections 32B, 34B are pivotably coupled to the respective inner boom sections 32A, 34A at pivot joints 46 while the outer boom sections 32C, 34C are pivotably coupled to the respective middle boom sections 32B, 34B at pivot joints 48.

As is generally understood, pivot joints 44, 46, 48 may be configured to allow relative pivotal motion between adjacent boom sections of the sprayer boom 28. For example, the pivot joints 44, 46, 48 may allow for articulation of the various boom sections between a fully extended or working position (e.g., as shown in FIG. 1), in which the boom sections are unfolded along the lateral direction 50 to allow for the performance of an agricultural spraying operation, and a transport position (FIG. 2), in which the boom sections are folded inwardly to reduce the overall width of the sprayer boom 28 along the lateral direction 50. It should be appreciated that, although the sprayer boom 28 is shown in FIG. 1 as including a central boom section and three individual boom sections coupled to each side of the central boom sections, the sprayer boom 28 may generally have any suitable number of boom sections. For example, in other embodiments, each boom arm 32, 34 may include four or more boom sections or less than three boom sections.

Additionally, as shown in FIG. 1, the sprayer boom 28 may include inner fold actuators 52 coupled between the inner boom sections 32A, 34A and the central boom section 30 to enable pivoting or folding between the fully-extended working position and the transport position. For example, by retracting/extending the inner fold actuators 52, the inner boom sections 32A, 34A may be pivoted or folded relative to the central boom section 30 about a pivot axis 44A defined by the pivot joints 44. Moreover, the sprayer boom 28 may also include middle fold actuators 54 coupled between each inner boom section 32A, 34A and its adjacent middle boom section 32B, 34B and outer fold actuators 56 coupled between each middle boom section 32B, 34B and its adjacent outer boom section 32C, 34C. As such, by retracting/extending the middle and outer fold actuators 54, 56, each middle and outer boom section 32B, 34B, 32C, 34C may be pivoted or folded relative to its respective inwardly adjacent boom section 32A, 34A, 32B, 34B about a respective pivot axis 46A, 48A. When moving to the transport position, the sprayer boom 28 and fold actuators 52, 54, 56 are typically oriented such that the pivot axes 44A, 46A, 48A are parallel to the vertical direction 58 and, thus, the various boom sections 32A, 34A, 32B, 34B, 32C, 34C of the sprayer boom 28 are configured to be folded horizontally (e.g., parallel to the lateral direction 50) about the pivot axes 44A, 46A, 48A to keep the folding height of the boom 28 as low as possible for transport. However, the pivot axes 44A, 46A, 48A may be oriented along any other suitable direction.

Additionally, it should be appreciated that the specific configuration of the agricultural sprayer 10 described above and shown in FIGS. 1 and 2 is provided only to place the present subject matter in an exemplary field of use. In this regard, it should be apparent to those of ordinary skill in the art that the present subject matter may be readily adaptable to any manner of machine configuration that is consistent with the disclosure provided herein.

As will be described in greater detail below, when a spray nozzle (e.g., spray nozzle 70) becomes plugged, the efficiency of a spraying operation of the agricultural sprayer 10 decreased. As such, it is important to clear a plugged spray nozzle as quickly as possible. However, manually cleaning the plugged spray nozzles may be time consuming and potentially hazardous to an operator. As such, a cleaning system may be provided to assist in cleaning spray nozzles that are detached from the spray nozzle assemblies.

Figure 4:
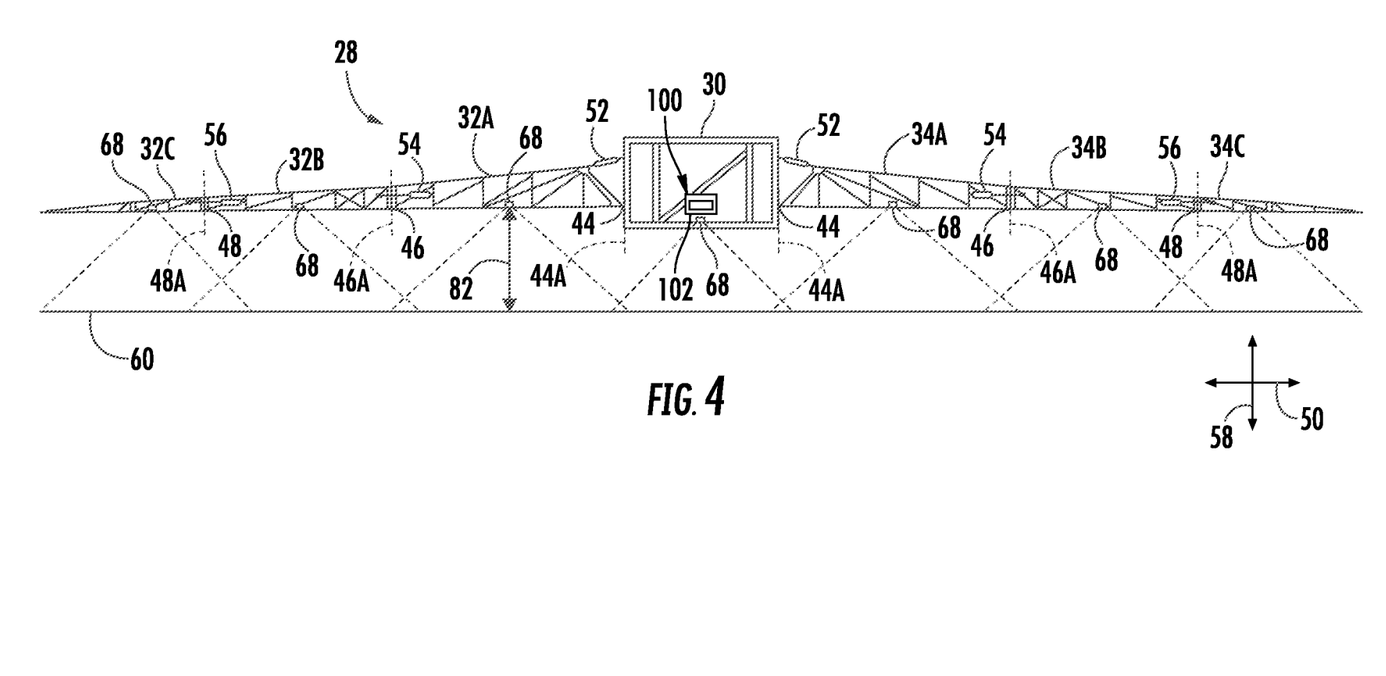
FIG. 4 illustrates a rear view of the agricultural sprayer of FIG. 1, particularly illustrating one embodiment of a cleaning system of an agricultural sprayer in accordance with aspects of the present subject matter.
Figure 5A:
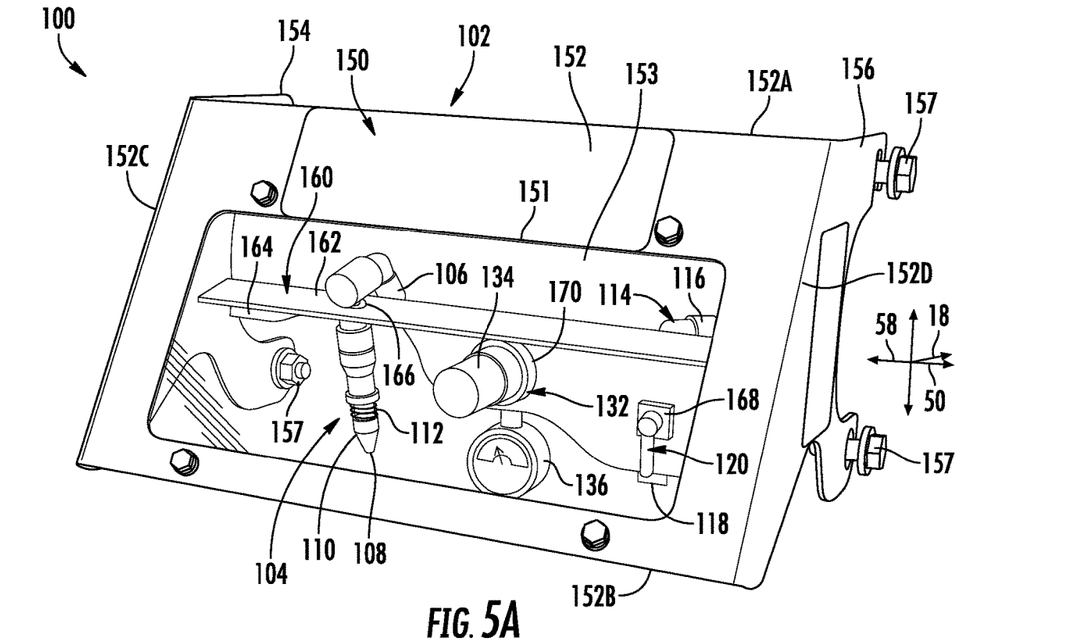
FIGS. 5A and 5B illustrate front and rear perspective views, respectively, of one embodiment of a cleaning system in accordance with aspects of the present subject matter.
Figure 5B:
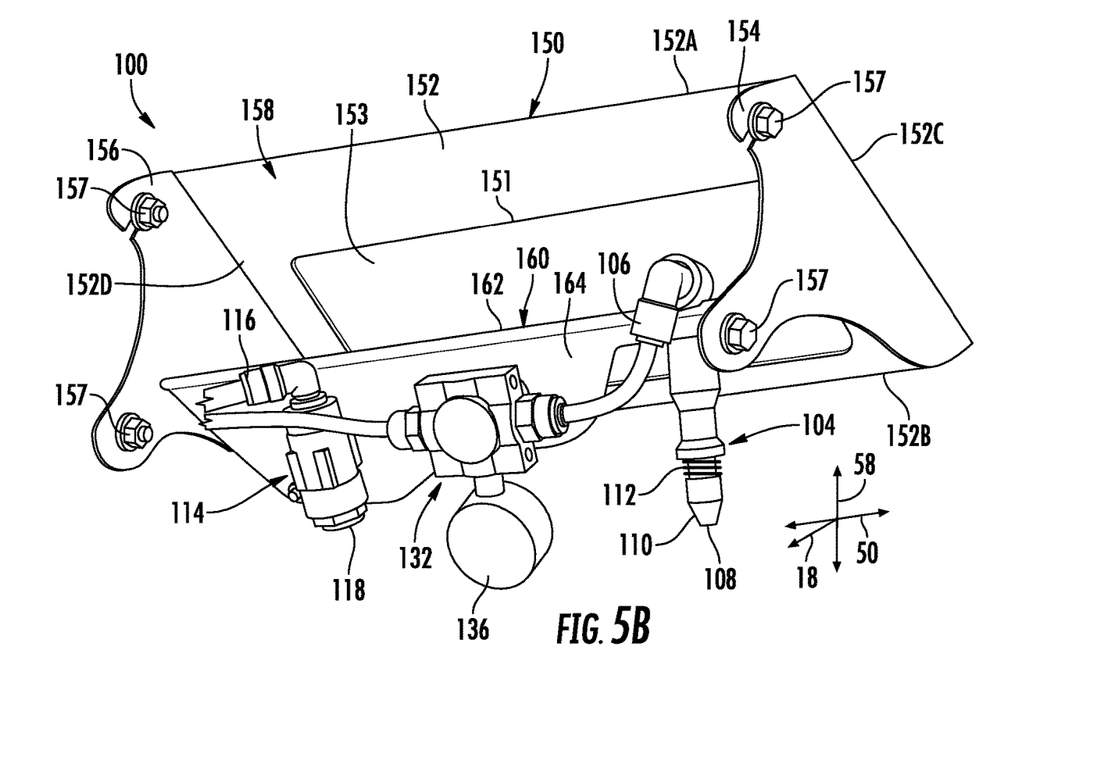
Figure 6:
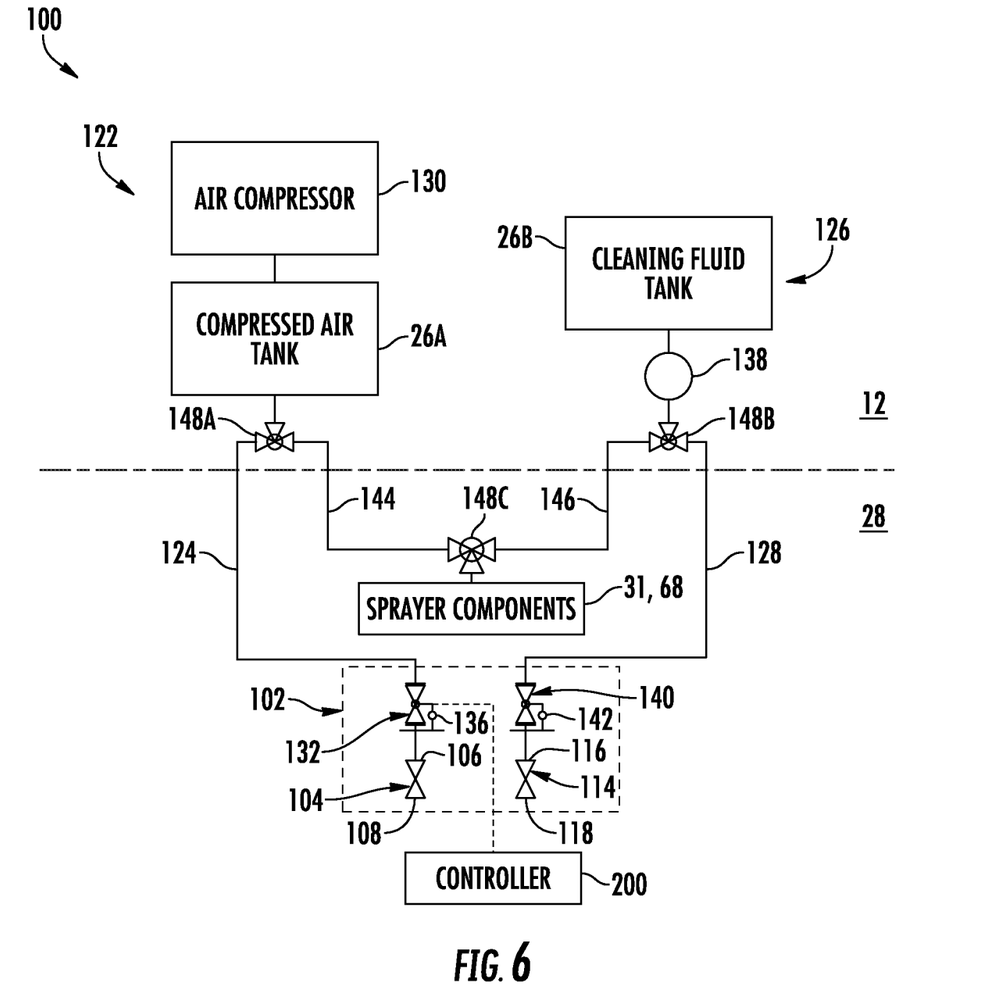
FIG. 6 illustrates a schematic view of one embodiment of a cleaning system for an agricultural sprayer in accordance with aspects of the present subject matter.

Referring now to FIGS. 4-6, various views of one embodiment of a cleaning system for an agricultural sprayer are illustrated in accordance with aspects of the present subject matter. Specifically. FIG. 4 illustrates a rear view of the agricultural sprayer shown in FIG. 1, particularly illustrating one embodiment of a cleaning system of an agricultural sprayer. FIGS. 5A and 5B illustrate front and rear perspective views, respectively, of one embodiment of a cleaning system. Additionally, FIG. 6 illustrates a schematic view of one embodiment of a cleaning system for an agricultural sprayer.

As shown in FIG. 4, a cleaning system 100 is provided in association with the sprayer boom 28. The cleaning system 100 includes a cleaning station 102 which is configured to selectively supply or dispense at least one cleaning fluid that may be used for cleaning plugged spray nozzles (e.g., spray nozzles 70) when removed from the nozzle assemblies 68, washing hands, and/or the like. In one embodiment, the cleaning station 102 is supported on the sprayer boom 28. For instance, the cleaning station 102 may be positioned on a rear side of the sprayer boom 28 for easy access after removing one or more of the spray nozzles (e.g., spray nozzle 70) of the nozzle assemblies 68. More particularly, in one embodiment, the cleaning station 102 may be supported on the central boom section 30 of the sprayer boom 28.

However, it should be appreciated that the cleaning station 102 may alternatively be supported at any other location on the sprayer boom 28 and/or on the frame 12. Further, while only one cleaning station 102 is shown, it should be appreciated that the cleaning system may include any other suitable number of cleaning stations 102, such as two or more cleaning stations 102, which may be provided on the same boom section or on different boom sections of the sprayer boom 28 and/or on the frame 12.

As particularly shown in FIGS. 5A-6, the cleaning station 102 includes at least one cleaning fluid valve for selectively supplying cleaning fluid therethrough. For instance, the cleaning station 102 may, in some embodiments, include a compressed air valve 104 configured to selectively supply compressed air therethrough. In general, the compressed air valve 104 includes a compressed air inlet 106 through which compressed air is supplied to the compressed air valve 104 and a compressed air outlet 108 through which compressed air exits the compressed air valve 104. In one embodiment, the compressed air outlet 108 is generally angled downwardly to prevent debris or cleaning fluid from being directed towards an operator's face. The compressed air valve 104 is adjustable between an open position and a closed position where, in the open position, compressed air is supplied through the compressed air valve 104 and exits through the compressed air outlet 108 and, in the closed position, compressed air is prevented from exiting through the compressed air outlet 108.

In one embodiment, as shown in FIGS. 5A and 5B, the compressed air valve 104 is configured as a spring-loaded valve having a tip 110 and a spring 112, where the tip 110 is movable between a first position associated with an open position of the compressed air valve 104 and a second position associated with a closed position of the compressed air valve 104, where the spring 112 biases the tip 110 towards the second position (e.g., into the closed position). The tip 110 may be moved against the bias of the spring 112 from the first position, where the outlet 108 of the compressed air valve 104 is spaced from a distal end of the spring 112 by a first distance, to the second position where the outlet 108 is spaced from the distal end of the spring 112 by a second distance, where the second distance is smaller than the first distance. For example, an operator may press a spray nozzle 70 (FIG. 3) detached from one of the spray nozzle assemblies 68 (FIG. 3) upward against the tip 110 against the bias of the spring 112 to move the valve 104 into the open position. However, it should be appreciated that the tip 110 may be moved in any other suitable way. It should further be appreciated that the compressed air valve 104 may be configured as any other suitable valve type, such as a ball valve, a globe valve, a butterfly valve, a gate valve, and/or the like that is actuatable in any suitable manner.

Similarly, as particularly shown in FIGS. 5A-6, the cleaning station 102 may, in some embodiments, include a cleaning fluid valve 114 configured to selectively supply a different cleaning fluid therethrough. In general, the cleaning fluid valve 114 includes a cleaning fluid inlet 116 through which cleaning fluid is supplied to the cleaning fluid valve 114 and a cleaning fluid outlet 118 through which cleaning fluid exits the cleaning fluid valve 114. In one embodiment, the cleaning fluid outlet 118 is generally angled downwardly to prevent debris or cleaning fluid from being directed towards an operator's face. The cleaning fluid valve 114 is movable between an open position and a closed position where, in the open position, cleaning fluid is supplied through the cleaning fluid valve 114 and exits through the cleaning fluid outlet 118 and, in the closed position, cleaning fluid is prevented from exiting the cleaning fluid outlet 118. For instance, in one embodiment, as shown in FIGS. 5A and 5B, the cleaning fluid valve 114 is configured as a ball valve, globe valve, or a butterfly valve, where rotation of a handle 120 moves the cleaning fluid valve 114 between a first position associated with an open position of the cleaning fluid valve 114 and a second position associated with a closed position of the cleaning fluid valve 114. For example, an operator may manually turn the handle 120 between the first and second positions. However, it should be appreciated that the cleaning fluid valve 114 may be actuated in any other suitable way. For example, the cleaning fluid valve 114 may be actuated by a computer-operated solenoid in response to motion detected based on data from a motion-sensor. It should further be appreciated that the cleaning fluid valve 114 may be configured as any other suitable valve type, such as a gate valve, a spring-loaded valve, and/or the like.

The cleaning valves 104, 114 may be fluidly coupled to respective cleaning fluid sources. For instance, as shown in FIG. 6, the compressed air valve 104 is fluidly coupled to a compressed air source 122 by a compressed air circuit 124 and the cleaning fluid valve 114 is fluidly coupled to a different cleaning fluid source 126 by a cleaning fluid circuit 128. In one embodiment, the compressed air source 122 may include a compressed air tank 26A for holding compressed air. Further, in some embodiments, the compressed air source 122 may include an air compressor 130 fluidly coupled to the compressed air tank 26A, with the air compressor 130 being configured to generate compressed air. However, in other embodiments, the compressed air source 122 may include the air compressor 130 alone. In some embodiments, the compressed air source 122 is supported on the frame 12 (FIGS. 1 and 2) of the sprayer 10. However, in other embodiments, the compressed air source 122 may instead be supported on the sprayer boom 28.

The cleaning fluid source 126 may similarly include a cleaning fluid tank 26B for holding a cleaning fluid. In one embodiment, the cleaning fluid comprises water. However, in other embodiments, the cleaning fluid may comprise any other suitable liquid, such as a premixed cleaning solution. In some embodiments, the cleaning fluid source 126 is supported on the frame 12 (FIGS. 1 and 2) of the sprayer 10. However, in other embodiments, the cleaning fluid source 126 may be supported on the sprayer boom 28. In some embodiments, the cleaning fluid tank 26B may be an existing tank on the sprayer 10, such as a rinse tank of the sprayer 10.

Moreover, the cleaning station 102 may further include one or more elements for adjusting a pressure of the cleaning fluid supplied through the cleaning fluid circuits 124, 128 to the cleaning fluid valves 104, 114. For instance, as shown in FIG. 6, the cleaning station 102 includes a compressed air pressure regulator 132 fluidly coupled between the compressed air valve 104 and the compressed air circuit 124, where the compressed air pressure regulator 132 is adjustable to vary a pressure of the compressed air supplied through the compressed air circuit 124. For example, as shown in FIGS. 5A-6, the compressed air pressure regulator 132 is a valve having a handle 134 that is actuatable (e.g., rotatable) to vary the pressure of the compressed air supplied from the compressed air circuit 124 through the compressed air pressure regulator 132. In some embodiments, the compressed air pressure regulator 132 is configured as a pressure reducing valve that reduces the pressure of the compressed air supplied through the compressed air circuit 124 before the compressed air reaches the compressed air valve 104.

For example, the compressed air pressure regulator 132 may include a ball valve, a globe valve, a butterfly valve, or a poppet valve. Further, in some embodiments, the compressed air pressure regulator 132 may be a manually actuatable valve. However, the compressed air pressure regulator 132 may be any other suitable type of valve. Additionally, in some embodiments, the compressed air pressure regulator 132 may include a gauge 136 for indicating the pressure of the compressed air supplied through the compressed air valve 104. The gauge 136 may be analog or digital.

In one embodiment, the cleaning system 100 includes a controller 200 communicatively coupled to the compressed air pressure regulator 132 (as indicated by dashed lines in FIG. 6) such that the controller 200 may automatically control the operation of the compressed air pressure regulator 132. For instance, the compressed air pressure regulator 132 may be automatically controlled by the controller 200 to adjust the pressure of the compressed air supplied through the compressed air circuit 124, such as by increasing the pressure the longer the compressed air valve 104 is in the open position. Similarly, in one embodiment, the compressed air pressure regulator 132 may be automatically controlled by the controller 200 to cycle the pressure of the compressed air supplied through the compressed air circuit 124 while the compressed air valve 104 is in the open position. Alternatively, or additionally, in some embodiments, the compressed air pressure regulator 132 may be actively controlled by the controller 200 based on the measured flow from a flow sensor. For instance, the controller 200 may further be communicatively coupled to the gauge 136. The controller 200 may compare the measured air pressure from the gauge 136 to a threshold air pressure indicative of the expected air pressure flowing through a clean spray nozzle. If the measured air pressure is below the threshold air pressure, the compressed air pressure regulator 132 may then be controlled to increase the pressure of the compressed air. It should be appreciated that the measured air pressure may be compared to any suitable number of thresholds, such as one, two, three or more thresholds.

It should be appreciated that the controller 200 may correspond to any suitable processor-based device(s), such as a computing device or any combination of computing devices. For example, the controller 200 may generally include one or more processor(s) and associated memory devices configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device may generally be configured to store information accessible to the processor(s), including data that can be retrieved, manipulated, created and/or stored by the processor(s) and instructions that can be executed by the processor(s).

Similarly, as shown in FIG. 6, in some embodiments, the cleaning station 102 may include a pump 138 and a cleaning fluid pressure regulator 140 to vary the pressure of the cleaning fluid supplied through the cleaning fluid circuit 128 to the cleaning fluid valve 114. More particularly, the pump 138 may be fluidly coupled between the cleaning fluid tank 26B and the cleaning fluid circuit 128 and may be configured to adjust a pressure of the cleaning fluid supplied from the cleaning fluid tank 26B through the cleaning fluid circuit 128. For instance, in some embodiments, when the pump 138 is not operating, the cleaning fluid supplied from the cleaning fluid tank 26B is gravity fed through the cleaning fluid circuit 128. As such, it may be desirable to operate the pump 138 such that the cleaning fluid may be supplied through the cleaning fluid circuit 128 at a higher pressure.

The cleaning fluid pressure regulator 140 is adjustable to vary a pressure of the cleaning fluid supplied through the cleaning fluid circuit 128. The cleaning fluid pressure regulator 140 may be configured substantially the same as the compressed air pressure regulator 132. For instance, the cleaning fluid pressure regulator 140 may be fluidly coupled between the cleaning fluid valve 114. The cleaning fluid pressure regulator 140 may be a valve that is actuatable to vary the pressure of the cleaning fluid supplied from the cleaning fluid circuit 128 through the cleaning fluid pressure regulator 140. In some embodiments, the cleaning fluid pressure regulator 140 is configured as a pressure reducing valve that reduces the pressure of the cleaning fluid supplied through the cleaning fluid circuit 128 before the cleaning fluid reaches the cleaning fluid valve 114. For example, the cleaning fluid pressure regulator 140 may include a ball valve, a globe valve, a butterfly valve, or a poppet valve. Further, in some embodiments, the cleaning fluid pressure regulator 140 may be a manually actuatable valve. However, the cleaning fluid pressure regulator 140 may be any other suitable type of valve. Additionally, in some embodiments, the cleaning fluid pressure regulator 140 may include a gauge 142 for indicating the pressure of the cleaning fluid supplied through the cleaning fluid valve 114. The gauge 142 may be analog or digital.

As further shown in FIG. 6, in some embodiments, the cleaning fluid sources 122, 126 may be configured to supply fluid to other components of the agricultural sprayer 10. For instance, the compressed air source 122 and the cleaning fluid source 126 may be further couplable to one or more components of the sprayer 10 used during spraying operations, such as the suspension system 31, the nozzle assemblies 68, and/or the like. For example, the compressed air source 122 may be couplable to the sprayer components 31, 68 by one or more further fluid circuits, such as a first fluid circuit 144 and a second fluid circuit 146. In such embodiments, a first valve 148A may be configured to control the supply of compressed air from the compressed air source 122 to the compressed air circuit 124 and the first fluid circuit 144. Similarly, a second valve 148B may be configured to control the supply of cleaning fluid from the cleaning fluid source 126 to the cleaning fluid circuit 128 and the second fluid circuit 146. Additionally, a third valve 148C may be configured to control the supply of compressed air and cleaning fluid from the fluid circuits 144, 146 to the sprayer components 31, 68. It should be appreciated that while the compressed air source 122 and the cleaning fluid source 126 are shown as being couplable by a single, respective fluid circuit 144, 146 to the sprayer components 31, 68, the fluid circuits 144, 146 may comprise separate fluid circuits between each of the components 31, 68 and each of the compressed air source 122 and the cleaning fluid source 126.

Referring back to FIGS. 5A and 5B, in some embodiments, the cleaning station 102 may include a housing 150. The housing 150 may generally be configured to support components of the cleaning station 102 (e.g., the cleaning fluid valves 104, 114 and/or the pressure regulator(s) 132, 140) relative to the boom 28 (FIGS. 1 and 2) of the agricultural sprayer 10 and to protect an operator from any debris and cleaning fluids when the cleaning station 102 is in use. As shown, the housing 150 includes a first wall 152 extending between a top end 152A and a bottom end 152B spaced apart along the vertical direction 58, and between a first lateral side 152C and a second lateral side 152D spaced apart along the lateral direction 50. The first wall 152 may include an opening 151 within which a shield 153 may be mounted. The shield 153 is configured to provide an operator a view through the first wall 152, while being protected from any debris or cleaning fluids. For example, the shield 153 may be transparent or semi-transparent glass, plastic, and/or the like.

The housing 150 may further include side walls, such as a second wall 154 and a third wall 156 extending from the first and second lateral sides 152C, 152D of the first wall 152, respectively, along the direction of travel 18 (generally perpendicular to the lateral and vertical directions 50, 58). In one embodiment, the side walls 154, 156 of the housing 150 may be configured to be coupled to the sprayer 10 (e.g., to the frame 12 or sprayer boom 28) for mounting the housing 150 to the sprayer 10. For instance, one or more fasteners 157 (e.g., bolts, screws, rivets, and/or the like) may be received through the side walls 154, 156 and the sprayer 10, and/or the side walls 154, 156 may be welded to the sprayer 10. However, the housing 150 may be coupled to the sprayer 10 by any other suitable portion and/or in any other suitable way.

The walls 152, 154, 156 define an interior volume 158 (FIG. 5B) of the housing 150, within which the valve 104, 114 and the pressure regulator(s) 132, 140 are at least partially housed. More particularly, the housing 150 may include a support structure 160 having an upper support surface 162 and a lower support surface 164. The upper support surface 162 generally extends between the second and third walls 154, 156 along the lateral direction. The lower support surface 164 generally extends downward from the upper support surface 162 along the vertical direction 58. The upper support surface 162 may be configured to support the compressed air valve 104. For instance, the upper support surface 162 may include an opening 166 (FIG. 5B) through which the compressed air valve 104 may be received. Similarly, the lower support surface 164 may be configured to support the cleaning fluid valve 114. For instance, the lower support surface 164 may include an opening 168 (FIG. 5A) for receiving a portion of the cleaning fluid valve 114 (e.g., handle 120). Additionally, the lower support surface 164 may be configured to support the pressure regulator(s) 132, 140. For instance, as shown in FIG. 5A, the lower support surface 164 may further include an opening 170 for receiving a portion (e.g., handle 134) of the compressed air pressure regulator 132. The lower support surface 164 may similarly include an opening (not shown) for receiving a portion of the cleaning fluid pressure regulator 140.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cleaning system for an agricultural sprayer, the system comprising:
    a sprayer boom;
    a plurality of nozzle assemblies provided in association with the sprayer boom, the plurality of nozzle assemblies being configured to dispense an agricultural product during a spraying operation of the agricultural sprayer;
    a first cleaning fluid tank configured to hold a first cleaning fluid;
    a nozzle assembly fluid circuit fluidly coupling the plurality of nozzle assemblies and the first cleaning fluid tank;
    a cleaning station supported on the sprayer boom, the cleaning station comprising a first valve; and
    a first cleaning fluid circuit fluidly coupling the first valve and the first cleaning fluid tank, the first cleaning fluid circuit being coupled in parallel with the nozzle assembly fluid circuit to the first cleaning fluid tank,
    wherein the first valve is configured to supply the first cleaning fluid therethrough when the first valve is in an open position to dispense the first cleaning fluid at the cleaning station.

2. The system of claim 1, wherein the first cleaning fluid comprises compressed air.

3. The system of claim 1, wherein the cleaning station further comprises a first pressure regulator that is adjustable to vary a pressure of the first cleaning fluid supplied through the first cleaning fluid circuit.

4. The system of claim 1, wherein the first valve comprises a spring-loaded valve having a tip and a spring, the tip being movable between a first position associated with the open position of the first valve and a second position associated with a closed position of the first valve, the spring biasing the tip towards the second position, the first valve being in the open position when the tip is moved against the bias of the spring into the first position.

5. The system of claim 1, wherein the first cleaning fluid tank is a water tank supported on the agricultural sprayer, the first cleaning fluid comprising water from the water tank.

6. The system of claim 5, further comprising a pump operable to increase a pressure of the water supplied through the first cleaning fluid circuit,
    wherein the cleaning station further comprises a pressure regulator adjustable to vary a pressure of the water supplied through the first cleaning fluid circuit.

7. The system of claim 1, wherein each of the plurality of nozzle assemblies includes a detachable spray nozzle that is detachable from the respective one of the plurality of nozzle assemblies, the first cleaning fluid being supplied by the first valve for cleaning the spray nozzle detached from a given nozzle assembly of the plurality of nozzle assemblies, the first cleaning fluid being different than the agricultural product.

8. The system of claim 1, further comprising:
    a second cleaning fluid tank configured to hold a second cleaning fluid; and
    a second cleaning fluid circuit, wherein the cleaning station further comprises a second valve fluidly coupled to the second cleaning fluid tank by the second cleaning fluid circuit, and wherein the second valve is configured to supply the second cleaning fluid therethrough when the second valve is in an open position to dispense the second cleaning fluid at the cleaning station.

9. The system of claim 8, wherein the first cleaning fluid comprises compressed air, and wherein the second cleaning fluid tank is a water tank supported on the agricultural sprayer, the second cleaning fluid comprising water from the water tank.

10. The system of claim 8, wherein each of the plurality of nozzle assemblies includes a detachable spray nozzle that is detachable from the respective one of the plurality of nozzle assemblies, the second cleaning fluid being supplied by the second valve for cleaning the spray nozzle detached from a given spray nozzle of the plurality of nozzle assemblies, the second cleaning fluid being different than the first cleaning fluid and the agricultural product.

11. The system of claim 1, wherein the cleaning station further comprises a housing, the first valve being at least partially received within the housing.

12. An agricultural sprayer, comprising:
a sprayer boom;
a plurality of nozzle assemblies provided in association with the sprayer boom, the plurality of nozzle assemblies being configured to dispense an agricultural product during a spraying operation of the agricultural sprayer;
a compressed air supply configured to provide compressed air;
a cleaning station supported on the agricultural sprayer, the cleaning station comprising a compressed air valve; and
a cleaning air circuit fluidly coupling the compressed air valve and the compressed air supply,
wherein the compressed air valve is configured to supply compressed air therethrough when the compressed air valve is in an open position to dispense the compressed air at the cleaning station.

13. The agricultural sprayer of claim 12, wherein the cleaning station is supported on the sprayer boom.

14. The agricultural sprayer of claim 12, further comprising a nozzle assembly compressed air circuit fluidly coupling the plurality of nozzle assemblies and the compressed air supply, the nozzle assembly compressed air circuit being coupled in parallel with the cleaning air circuit to the compressed air supply.

15. The agricultural sprayer of claim 12, wherein the cleaning station further comprises a first pressure regulator that is adjustable to vary a pressure of the compressed air supplied through the cleaning air circuit.

16. The agricultural sprayer of claim 12, further comprising:
a cleaning fluid tank configured to hold a cleaning fluid; and
a cleaning fluid circuit,
wherein the cleaning station further comprises a second valve fluidly coupled to the cleaning fluid tank by the cleaning fluid circuit, and
wherein the second valve is configured to supply the cleaning fluid when the second valve is in an open position.

17. The agricultural sprayer of claim 16, wherein the cleaning fluid tank is a water tank supported on the agricultural sprayer, the cleaning fluid comprising water from the water tank.

18. The agricultural sprayer of claim 17, further comprising a pump operable to increase a pressure of the water supplied through the cleaning fluid circuit,
wherein the cleaning station further comprises a pressure regulator that is adjustable to vary a pressure of the water supplied through the cleaning fluid circuit.

19. The agricultural sprayer of claim 12, wherein the cleaning station further comprises a housing, the compressed air valve being at least partially received within the housing.

20. A cleaning station for an agricultural sprayer having a sprayer boom and a plurality of nozzle assemblies supported on the sprayer boom, the cleaning station comprising:
a housing defining an interior volume;
a first valve at least partially received within the interior volume of the housing, the first valve configured to be fluidly coupled to a compressed air source via a cleaning air circuit, the first valve being configured to supply compressed air from the compressed air source therethrough when in an open position to dispense the compressed air at the cleaning station;
a second valve at least partially received within the interior volume of the housing, the second valve configured to be fluidly coupled to a cleaning fluid source via a cleaning fluid circuit, the second valve being configured to supply cleaning fluid from the cleaning fluid source therethrough when in an open position to dispense the cleaning fluid at the cleaning station; and
a pressure regulator adjustable to vary a pressure of the compressed air or the cleaning fluid supplied to the first valve or the second valve, respectively.

\* \* \* \* \*